United States Patent [19]
Cain et al.

[11] 3,966,275
[45] June 29, 1976

[54] BEARING MOUNT

[75] Inventors: Earl S. Cain, Portola Valley; Jerome A. Carlson, Woodside; George E. Goodrich, San Carlos, all of Calif.

[73] Assignee: Tribotech, Redwood City, Calif.

[22] Filed: July 26, 1974

[21] Appl. No.: 492,214

[52] U.S. Cl. .............................. 308/15; 308/189 A
[51] Int. Cl.² ................................. F16C 13/00
[58] Field of Search ..................... 308/15, 189 A

[56] References Cited
UNITED STATES PATENTS

| 3,762,783 | 10/1973 | Hay | 308/189 A |
| 3,871,723 | 3/1975 | Pray | 308/15 |

Primary Examiner—Robert R. Song
Assistant Examiner—Richard A. Bertsch

[57] ABSTRACT

A bearing mount which can be mounted in selected orientations to selectively position a bearing with its normal rotational axis either perpendicular or parallel to a mounting surface.

17 Claims, 20 Drawing Figures

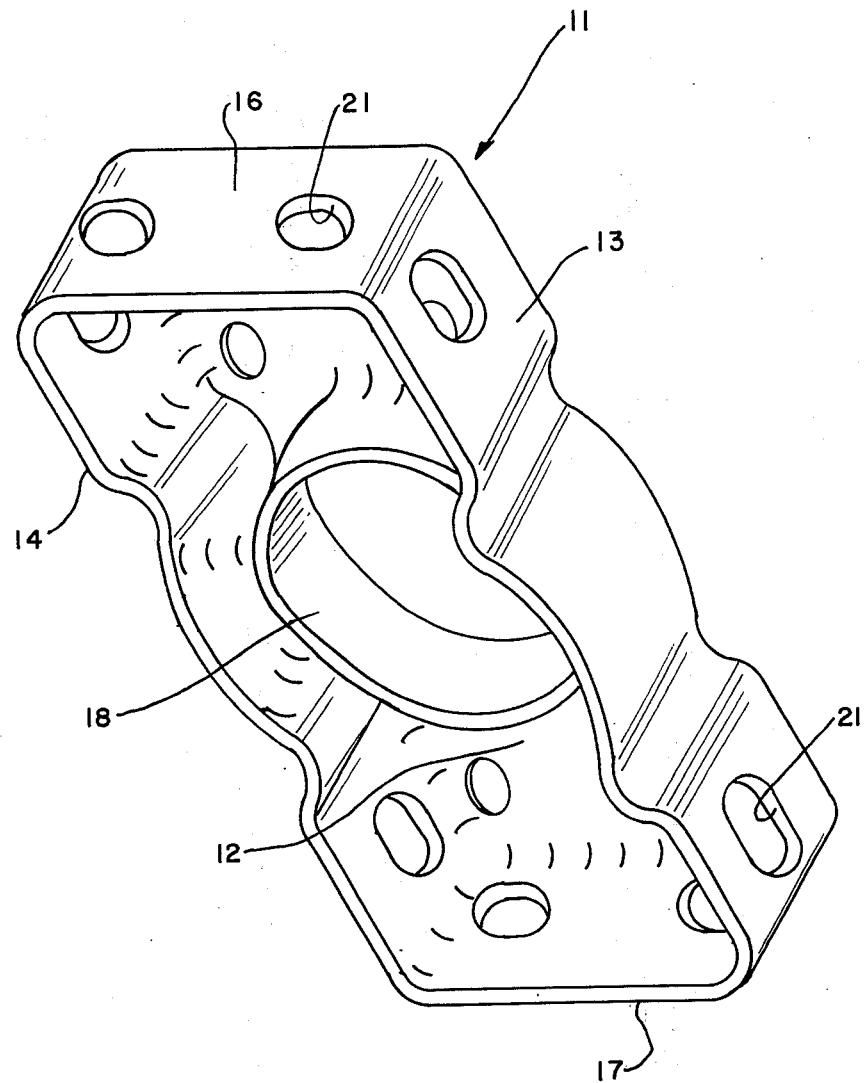
FIG.—1

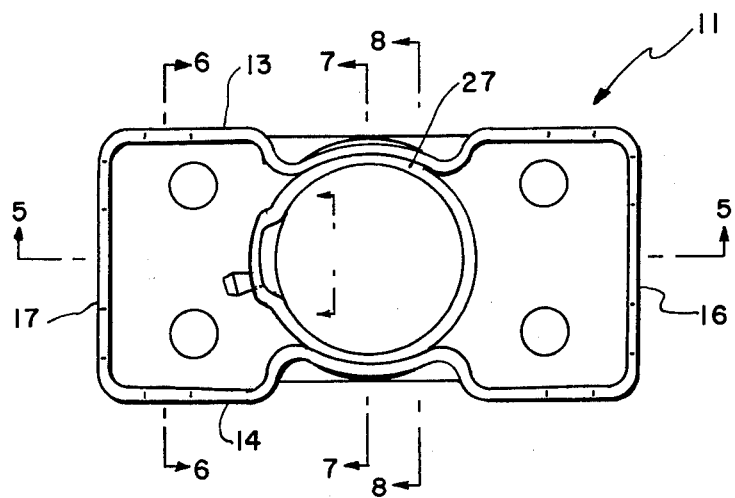
FIG.—2
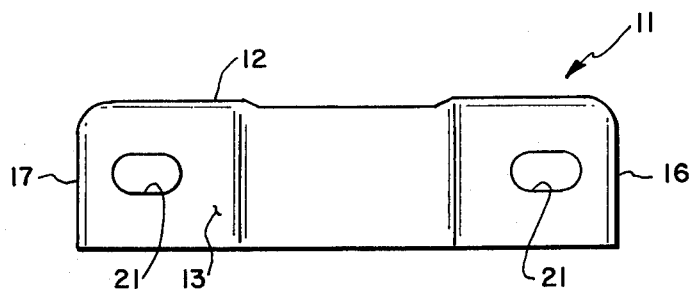
FIG.—3
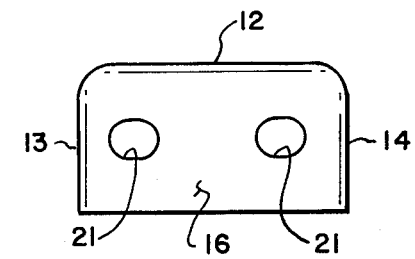
FIG.—4
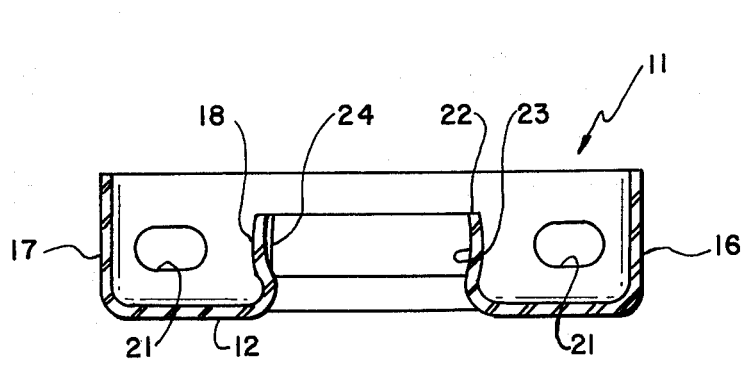
FIG.—5
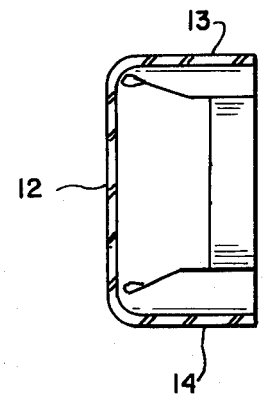
FIG.—6

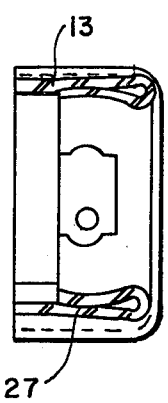
FIG.—7
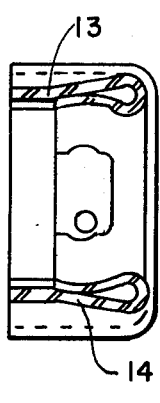
FIG.—8
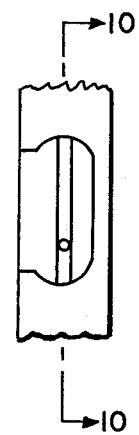
FIG.—9
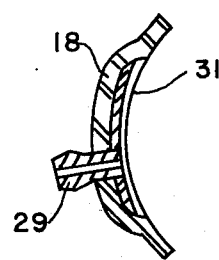
FIG.—10
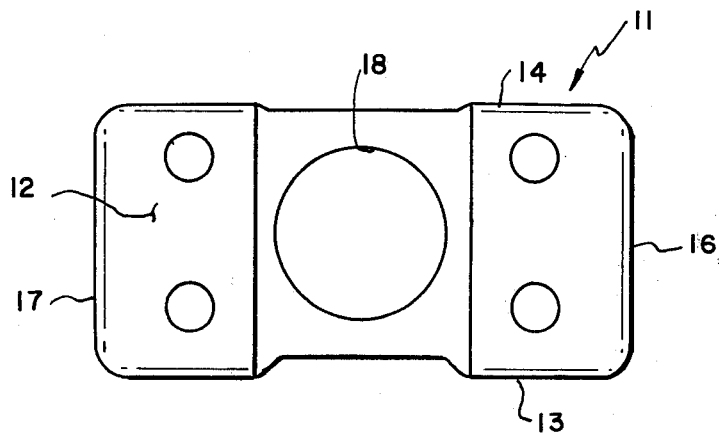
FIG.—11
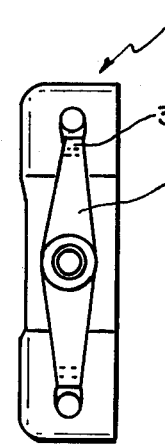
FIG.—12
FIG.—13
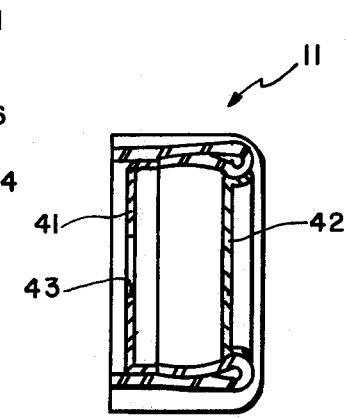
FIG.—14

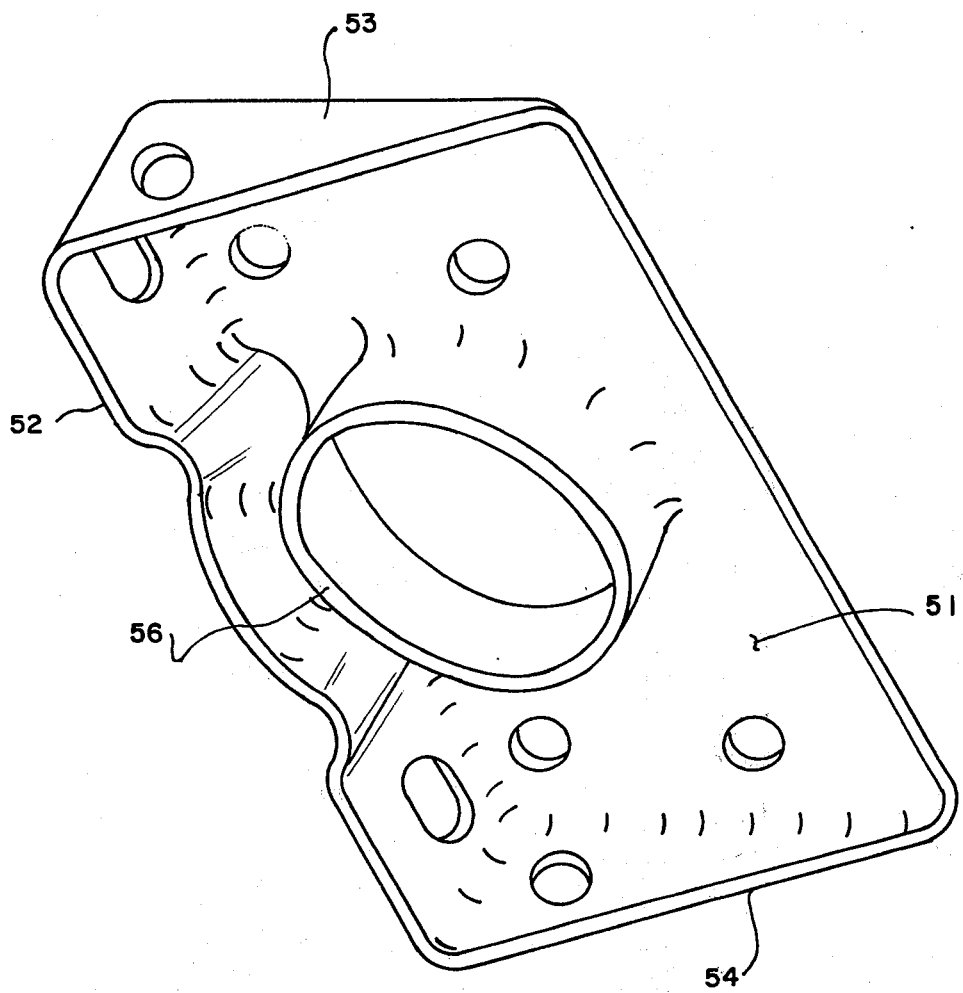
FIG.—15

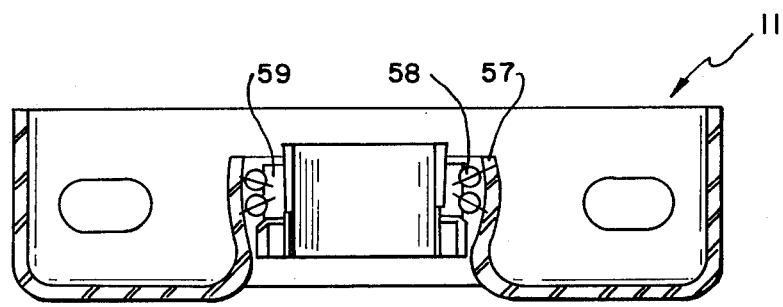
FIG.—16
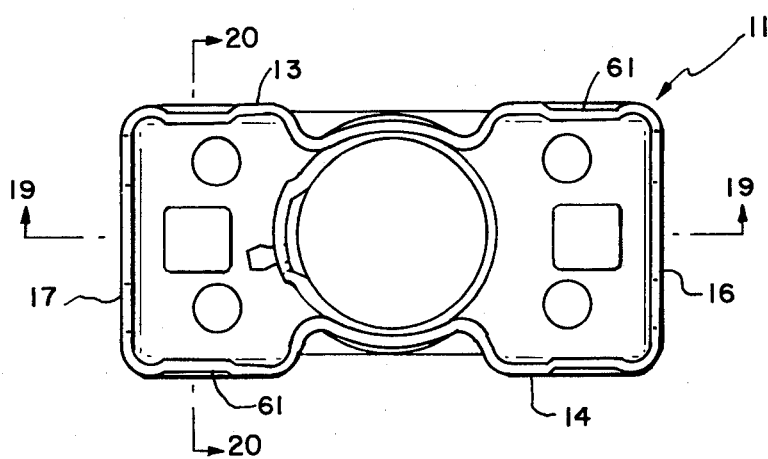
FIG.—17
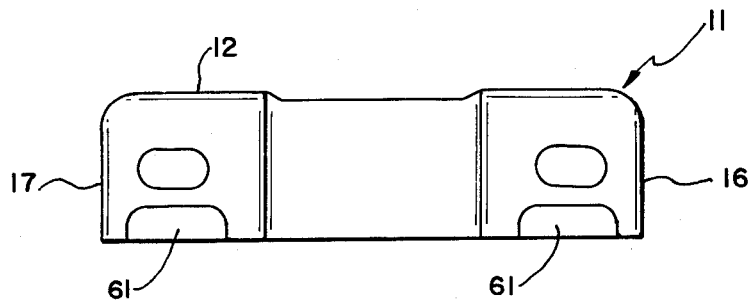
FIG.—18
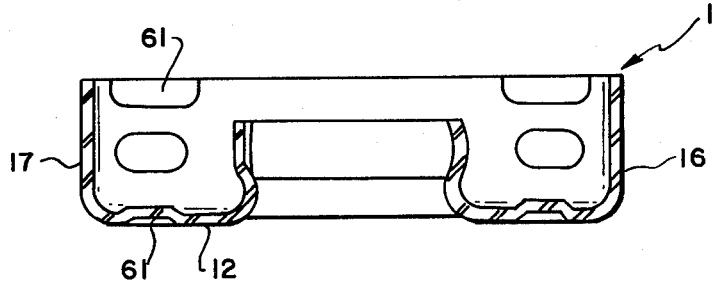
FIG.—19
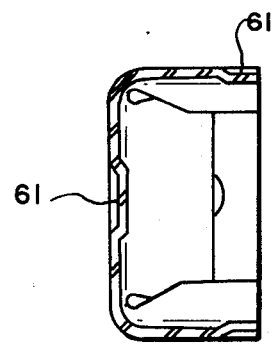
FIG.—20

BEARING MOUNT

BACKGROUND OF THE INVENTION

This invention relates generally to bearing mounts and more particularly to a bearing mount which can be mounted in selected orientation to position a bearing according to the requirement of a particular installation.

Bearings have in the prior art been mounted in a number of ways depending upon the class and type of duty to which they are subjected and the application in which they are used. In one class of application, the bearings are mounted with the rotational axis at 90° to the mounting surface (flange mount); with the rotational axis parallel to the mounting surface (pillow block mount); or with the rotational axis perpendicular to the mounting means and movable perpendicular thereto (take-up mounts) which in turn, are mounted to the equipment with which the bearings are associated. Typical applications for such bearings and mounts have been for conveyors of all types as, for example, used in the forest products industry, mining material handling and other industries. Such mounts have also been used in farm machinery such as harvesters, balers, coulters, in manufacturing process equipment, in heating and air conditioning equipment for commercial and residential use, in automatic car wash equipment, in boat trailers, in aircraft control and cargo systems and numerous other applications throughout all phases of economic activity.

The applications generally discussed above employ mounts in which installation misalignment and other mounting inaccuracies can be accommodated to permit easy bolt-on installation to inaccurate, inexpensive structural supports such as sheet metal, angles, plates, channels and the like. This ability is provided by a mount which allows a precision bearing to move relative to the mount to align with the associated shaft. Following bearing mount installation, the shafts are easily inserted into and locked to the bearing at minimal cost.

Bearings have been mounted in flange mountings which can be two-piece pressed or stamped steel or solid flange units in a variety of materials. The flange mounts are adapted to be face mounted to associated equipment by two, three or more bolts with the shaft generally running perpendicular to the mounting surface. Bearings have also been mounted in two-piece stamped or pressed steel pillow blocks or in solid pillow blocks in a variety of materials. The pillow blocks include bases for mounting to the associated equipment and the shafts generally extending parallel to the mounting base. In other uses, bearings have been mounted on take-up units which also have included two-piece stampings of pressed or stamped steel or cast housing each including means for engaging spaced guide means and cooperating with take-up means for moving the associated shaft in a direction generally perpendicular to its axis to tighten associated belts, chains or other drive means. A typical installation is in a conveyor take-up idler to maintain suitable belt tension.

It will be apparent that for light duty jobs, pressed or stamped steel housing or mounts are entirely suitable, whereas for heavy applications suitable heavy duty cast iron or steel flange mounts, pillow blocks or take-ups are required. The latter, of course, are bulky and heavy. The manufacturer and distributor must, of course, stock a large number and variety of bearing mounts in order to meet the various different types of duty and mounting requirements. In addition to the above, pillow blocks are manufactured with different mounting base bearing centerline heights to satisfy different installation needs and commercial standards, again increasing the number of pillow blocks which must be stored for different duties or installation configurations. The user, if he has multiple applications, must also store complete lines of different flange unit mountings, pillow blocks and take-up units. Consequently, the user, manufacturer and distributor must carry a large and complex inventory of bearing mounts to assure that the proper type of mount is available at all times to serve the multiple applications.

OBJECTS AND SUMMARY OF THE INVENTION

It is a general object of the present invention to provide a bearing mount which can be universally positioned and oriented to meet the requirements of alternate shaft axis orientation and position and multiple mounting means.

It is another object of the present invention to provide a bearing mount which can serve as a flange, pillow block or take-up mounting unit.

It is a further object of the present invention to provide a bearing mount for mounting a bearing to a mounting surface to accommodate shafts running parallel (pillow block), perpendicular (flange), or adjustably (take-up).

It is another object of the present invention to provide a simple, sturdy universal mount which can be easily fabricated from sheet material.

It is still a further object of the present invention to provide a bearing mount which is a single piece of formed, such as pressed or stamped, metal.

It is a further object of the invention to provide a bearing mounting means with alternate bearing centerline positions.

It is a further object to provide a bearing mounting means with universally adaptive shaft axis orientation capability in a single piece of formed metal, or molded synthetic material, or gravity or pressure cast metals or metal mixtures or other fabrication.

It is a further object to provide a universally mountable bearing means with characteristically minimum weight for strength requirements in thrust, radial and combined loading of the bearing mount and mounting.

It is a further object of the present invention to provide a universally mountable bearing means that can be welded or otherwise secured to a mounting surface.

The foregoing and other objects of the invention are achieved by a bearing mount including means defining a surface for receiving and holding a bearing means defining a plurality of mounting surfaces for positioning the mount on a support so that the bearing can be disposed in a number of positions, elevations and orientations, and means defining mounting surfaces being adapted to be secured to said support with a selected surface positioned in cooperative relation with said support.

BRIEF DESCRIPTION OF THE DRAWINGS

FIG. 1 is a perspective view of a bearing mount in accordance with the present invention.
FIG. 2 is a plan view of the bearing mount.
FIG. 3 is a side view of the bearing mount.

FIG. 4 is an end view of the bearing mount.

FIG. 5 is a sectional view taken along the line 5—5 of FIG. 2.

FIG. 6 is a sectional view taken along the line 6—6 of FIG. 2.

FIG. 7 is a sectional view taken along the line 7—7 of FIG. 2.

FIG. 8 is a sectional view taken along the line 8—8 of FIG. 2.

FIG. 9 is a partial view taken along the line 9—9 of FIG. 2.

FIG. 10 is a sectional view taken along the line 10—10 of FIG. 9.

FIG. 11 is a plan view of the bearing mount.

FIG. 12 shows the bearing mount employed in a take-up assembly.

FIG. 13 is a side view of the take-up assembly of FIG. 12.

FIG. 14 shows typical protective closures for protecting a bearing mounted in the mount of FIG. 1.

FIG. 15 is a perspective view of another bearing mount in accordance with the invention.

FIG. 16 is a sectional view showing a bearing mount in which the mount forms the outer race of the bearing.

FIG. 17 is a plan view of still another bearing mount in accordance with the invention.

FIG. 18 is a side view of the bearing mount of FIG. 17.

FIG. 19 is a sectional view taken along the line 19—19 of FIG. 17.

FIG. 20 is a sectional view taken along the line 20—20 of FIG. 17.

DESCRIPTION OF THE PREFERRED EMBODIMENT

Referring particularly to FIG. 1, the bearing mount is a box-like structure 11 which may be formed from sheet metal in a press. It will also become apparent that the mount can be formed by die casting, investment, sand or shell casting or by injection molding, by forging, bending or welding and other methods of forming a bearing mount. The mount shown is a unitary structure formed from a single sheet of material by stamping or pressing. The mount includes a flange plate 12 with integral spaced sides 13 and 14 and ends 16 and 17 defining the box-like structure. The flange plate 12 includes a bearing receiving flange 18 whose inner surface is substantially a surface of revolution to receive and hold an associated bearing. The outer surfaces of the flange plate and the sides and ends provide mounting surfaces of faces for engaging an associated support to position the bearing mount. The sides, ends and flange plate may be provided with a plurality of holes 21 adapted to receive securing means for securing the bearing mount to an associated supporting structure. The holes are preferably elongated whereby to provide lateral adjustment. The mount may also be secured to an associated support by welding, cementing or the like. It will be apparent that the bearing mount can be mounted in six orientations; namely, it can be mounted with either of its side surfaces, or either of its end surfaces, or the flange surface or the edges of the side and end surfaces engaging the associated support.

Referring particularly to the remainder of the figures, the flange 18 preferably extends inwardly into the box-like structure with its end 22 spaced inwardly from the edge of the box. The inner surface of revolution of the flange 18 includes a spherical surface 23 adapted to receive and hold a bearing having a spherical outer surface. The bearing is mounted in the spherical surface 23 by inserting the bearing into the bearing receiving flange 18 through the slot 24 and then rotating the bearing so that its axis is perpendicular to the flange plate. The spherical bearing seat, as is well known, provides means whereby the bearing can be aligned with an associated shaft even when the bearing mount is not accurately positioned with regard to the axis of the associated shaft.

Referring particularly to FIGS. 2, 6 and 7, it is seen that the sides 13 and 14 of the mount are bent inwardly adjacent the bearing flange 18 whereby they engage and surround a portion of the flange as shown at 27. This provides additional support and stiffening for the bearing flange and also stiffens the sides 13 and 14.

The bearing flange 18 may include means for receiving a grease fitting 29 which is adapted to fit in the slot as shown in FIG. 10. After the bearing is inserted, a grease seal 31 is inserted between the bearing and flange.

In accordance with the preferred embodiment of the invention, the bearing flange 18 is placed asymmetrically such as illustrated in FIG. 11 whereby the distance from one end is X while from the other end the distance is $X+\Delta$. Similarly, it is disposed at different distances from the sides so that the distances are Y and $Y+\Delta$. It is, therefore, seen that the mounting surfaces defined by different ends and different sides will place the centerline of an associated bearing at a different height or position from the associated supporting surface. In FIG. 11 a plurality of holes are shown in the flange plate. These holes are spaced and oriented whereby they correspond to the mounting holes in a conventional flange mount.

The bearing mount is further adapted to be placed upon spaced support rods such as 32 and 33, FIG. 12, whereby it can slide along the support rods. A bracket such as bracket 34 having hooked ends 36 may be inserted in the elongated holes 21 formed in the sides. A push rod 37 engages the bracket to move the mount in a direction generally perpendicular to the axis of the bearing by means of a suitable drive such as a threaded or hydraulic drive. The mount, therefore, serves as a take-up for belts, chains and the like.

A typical operation for pressing a mount of the type just described from a sheet of metal would be to form a dome in the center of a sheet of material; cut the material to form a blank of appropriate shape; pierce and draw the bearing flange; draw the sides and ends; bulge the flange to form a spherical seat and also form the insertion slot; bend the sides inwardly to engage and provide stiffening for the flange; trim the edges of the sides and ends; and pierce mounting holes.

The bearing mount described can easily be provided with protective closures to protect a mounted bearing against the environment during shipping, storage and use. Referring to FIG. 14, a suitable shield 41 and plug 42 is illustrated. The shield 41 includes a hole 43 for receiving an associated shaft. Alternatively, the plug 42 may include a hole for receiving an associated shaft. Both the shield and plug may be solid for shipping and storage.

It is seen that the bearing mount will have substantial strength regardless of the mounting position or orientation. The sides and ends will act both in compression and tension to maintain the flange plate substantially perpendicular to the mounting surface. The flange plate will provide considerable resistance against shear and torsional movement.

The preferred embodiment showed a box-like structure adapted to be mounted in six orientations. In certain applications this amount of versatility may not be required. Rather than a box-like structure, an L-shaped structure of the type illustrated in FIG. 15 may be used. The structure includes a flange plate 51, bottom or end wall 52, and spaced sides 53 and 54. A flange 56 is provided for receiving and supporting a bearing in the manner described above. The flange may include a spherical surface and a loading slot. Additionally, it may include means for receiving a grease fitting. The mounting may be oriented with the flange plate, either side or bottom engaging an associated support. The flange may be asymmetrical.

In certain instances the inner surface of the flange may be hardened and serve as the outer race of a bearing. This is illustrated in FIG. 16, where the flange 57 cooperates with balls 58 and inner race 59 to provide a self-aligning ball bearing.

Where a relatively thin walled box-like bearing mount is formed, it may be desirable to provide stiffening ribs such as the depressions 61, FIGS. 17–20 dimpling or creasing may also be employed. The remainder of the elements are identical to those described with reference to FIG. 2–5 and bear like reference numerals.

Thus, it is seen that there is provided an inexpensive bearing mount which will substantially reduce manufacturers', suppliers' and user' inventory. The bearing mount can be mounted on a mounting support in selected orientations to selectively position a bearing with its normal rotational axis either perpendicular or parallel to a mounting surface with the axis of the bearing at selected distances from the support.

We claim:

1. A bearing mount comprising: a flange plate having a bearing receiving flange extending outwardly of one face thereof and adapted to receive and hold a bearing therein, the other face of said flange plate defining a mounting surface substantially perpendicular to the axis of said flange for positioning said bearing mount on a supporting surface; at least one side plate extending laterally from said one face adjacent said flange, the surface of said side plate remote from said flange defining a second mounting surface substantially parallel to the axis of said flange; and said flange plate and side plate having means whereby either of said mounting surfaces may be secured to a supporting surface.

2. A bearing mount as in claim 1 wherein said flange is spherical to receive a bearing of spherical shape whereby the bearing can rotate in the mount to accommodate misalignment.

3. A bearing mount as in claim 1 wherein said at least one side plate includes a portion bent towards said flange to engage a portion of the flange to provide additional support and stiffening.

4. A bearing mount as in claim 1 including at least one additional side plate extending laterally from said one face adjacent said flange, the surface of said side plate remote from said flange defining a third mounting surface substantially parallel to the axis of said flange, said at least one additional side plate having means whereby its mounting surface may be secured to a supporting surface.

5. A bearing mount as in claim 4 wherein said side plates are at an angle with respect to one another and one edge of one merges with the adjacent edge of the other.

6. A bearing mount as in claim 4 wherein said side plates are disposed at a right angle with respect to one another.

7. A bearing mount as in claim 4 wherein said axis is at different distances from said mounting surfaces.

8. A bearing mount as in claim 4 wherein said side plates include means for receiving guide means whereby the mount is guided for movement in a direction perpendicular to the axis of the flange.

9. A bearing mount as in claim 1 including at least two additional side plates extending laterally from said one face adjacent said flange and parallel to one another, the surface of said side plates remote from said flange defining second and third mounting surfaces substantially parallel to the axis of said flange and to one another and each having one edge merging with the adjacent edges of said at least one side plate.

10. A mount as in claim 1 wherein the inner surface of said flange forms the outer race of said bearing.

11. A mount for receiving and holding a bearing for mounting the bearing in selected position and orientation with respect to a support comprising a flange plate having a bearing receiving flange extending outwardly of one face thereof and adapted to receive and hold a bearing therein, the other face of said flange plate defining a mounting surface substantially perpendicular to the axis of said flange for positioning said bearing mount on a supporting surface, at least four side plates extending laterally from said one face adjacent said flange, the surfaces of said side plates remote from said flange defining four mounting surfaces substantially parallel to the axis of said flange; and said flange plate and side plates having means whereby said mounting surfaces may be secured to a supporting surface.

12. A bearing mount as in claim 11 wherein said flange is spherical to receive a bearing of sperical shape whereby the bearing can rotate in the mount to accommodate misalignment.

13. A bearing mount as in claim 11 wherein said side plates include means for receiving guide means whereby the mount is guided for movement in a direction perpendicular to the axis of said flange.

14. A bearing mount as in claim 11 wherein said axis is at different distances from said mounting surfaces.

15. A bearing mount as in claim 11 wherein the edges of said side plates are trimmed to form an additional mounting surface.

16. A mount as in claim 11 wherein the inner surface of said flange forms the outer race of said bearing.

17. A bearing mount as in claim 11 wherein a pair of side plates disposed on opposite sides of said flange include a portion which is bent inwardly to engage a portion of said flange to provide additional support and stiffening.

* * * * *